Dec. 6, 1927.  
F. C. CALVO  
ELECTRIC BROILER  
Filed March 11, 1927  
1,651,868  
4 Sheets-Sheet 1

Inventor  
Francisco C. Calvo,

By Clarence A. O'Brien  
Attorney

Dec. 6, 1927.
F. C. CALVO
1,651,868
ELECTRIC BROILER
Filed March 11, 1927     4 Sheets-Sheet 2
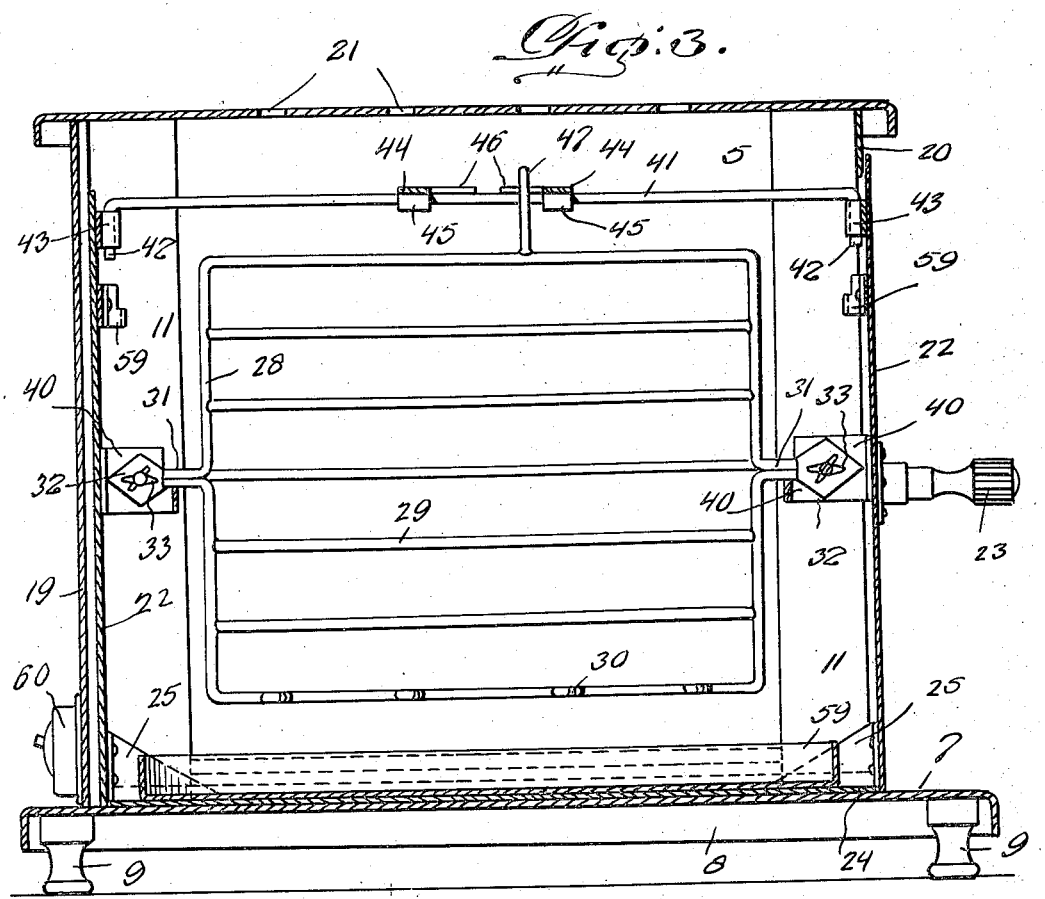
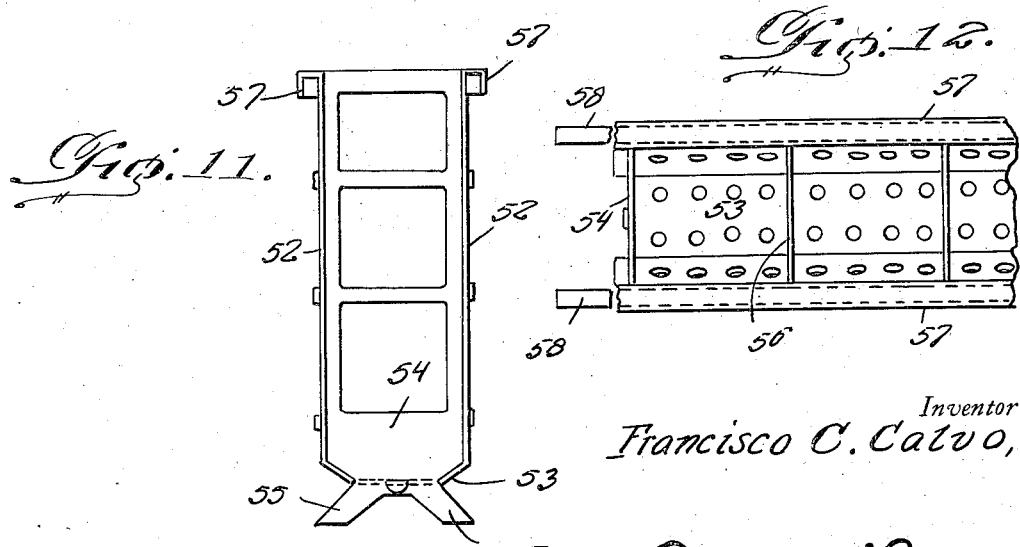
Inventor
Francisco C. Calvo,
By Clarence A O'Brien
Attorney

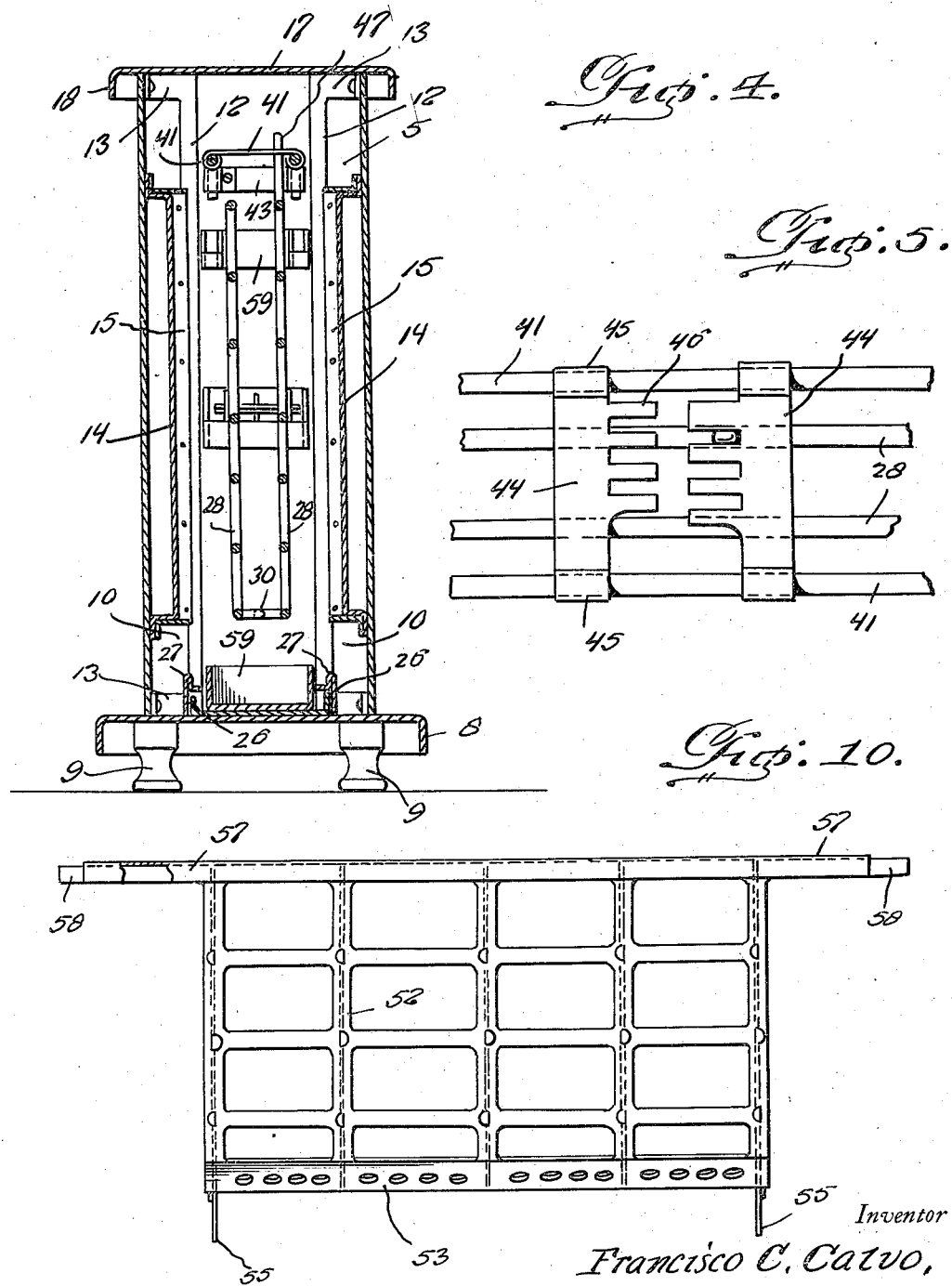

Figures 6, 7, 8, 9:
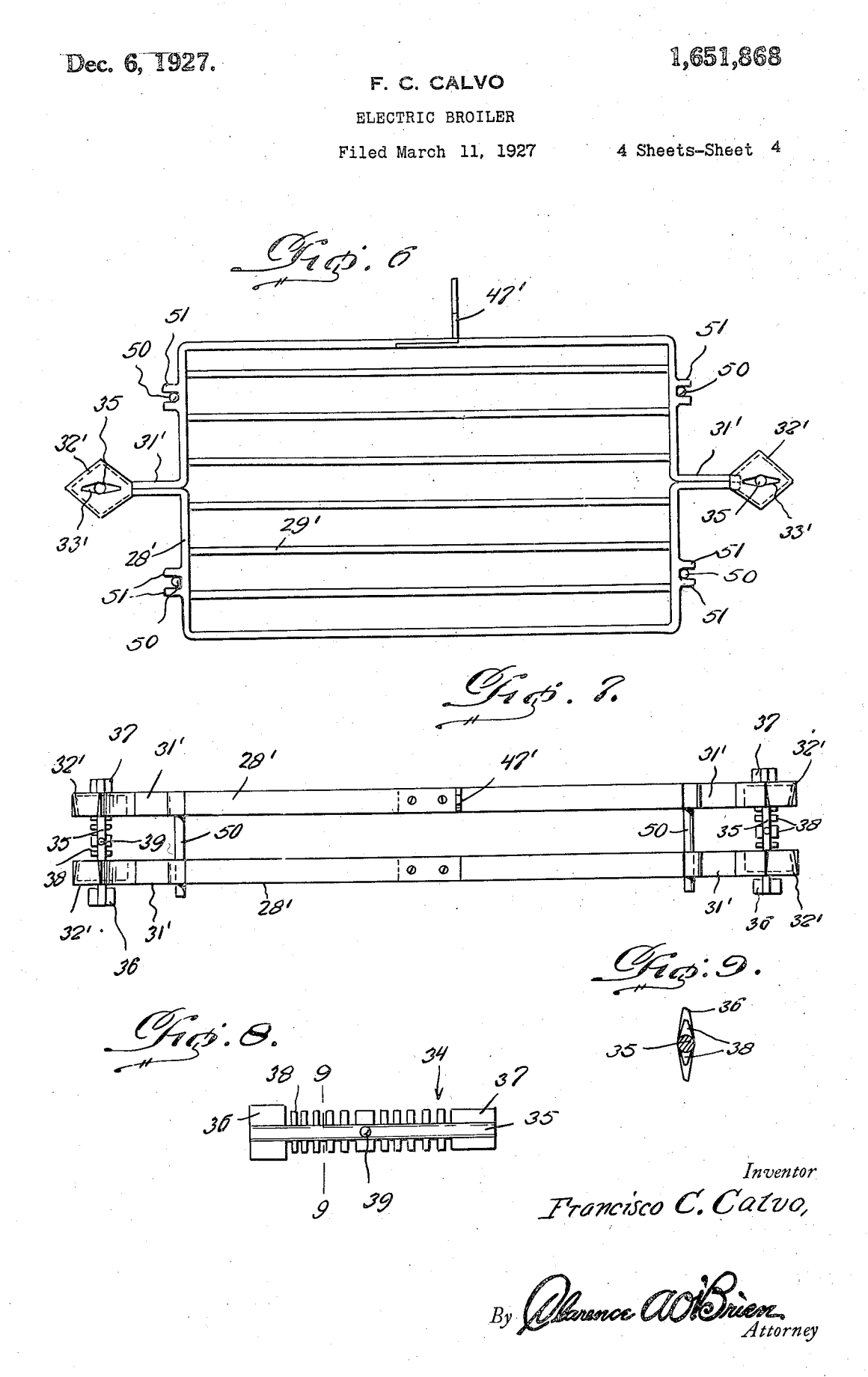

Dec. 6, 1927.

F. C. CALVO 1,651,868

ELECTRIC BROILER

Filed March 11, 1927    4 Sheets-Sheet 4

Inventor
Francisco C. Calvo,

By Clarence A. O'Brien
Attorney

Patented Dec. 6, 1927.

1,651,868

UNITED STATES PATENT OFFICE.

FRANCISCO C. CALVO, OF BROOKLYN, NEW YORK.

ELECTRIC BROILER.

Application filed March 11, 1927. Serial No. 174,534.

This invention relates to new and useful improvements in electrical appliances and has more particular reference to an electric broiler for use in the broiling of meats, fish and the like, the primary object of the invention residing in the provision of a device of this character that includes generally a narrow housing having electric heating units at the opposite sides and within the interior thereof, means being provided for supporting the food being cooked in proper position within the housing intermediate the heating units and spaced therefrom so that the meat or the like will be properly cooked on both sides and this in a relatively short time.

A further and most important object resides in the provision of an electrical broiling device wherein the food retaining mechanism may be readily withdrawn from the housing and wherein other forms of food supporting structures may be disposed therein for permitting the device to be used in the broiling of sausages, chops, etc. etc.

An additional object is to provide means for disposition within the housing whereby a steak or other similar character of meat may be firmly clamped therein in a flat-like manner, and this regardless of the thickness thereof.

A final salient object is to provide an electric broiling device of the aforementioned character that is relatively speaking of simple construction and inexpensive of manufacture, the same embodying simple structural details that are so co-related as to reduce the possibility of disarrangement to a minimum.

In the drawings wherein like reference characters indicate corresponding parts throughout the figures.

Figure 3 is a vertical sectional view taken longitudinally through the broiler.

Figure 4 is a transverse vertical section.

Figure 5 is a fragmentary top plan view of the toothed plate showing the same arranged on the horizontal bars.

Figure 6 is a side elevation of a modification of the rack.

Figure 7 is a top plan view thereof.

Figure 8 is a detail side elevation of the locking key, forming an important part of the present invention.

Figure 9 is a transverse section taken on the line 9—9 of Figure 8.

Figure 10 is a side elevation of a broiling pan that may be used in conjunction with the electric broiler.

Figure 11 is an end elevation thereof, and

Figure 12 is a top plan view.

First having reference to Figures 1 to 5 inclusive, and Figures 8 and 9, my novel electric broiler consists of a square or rectangular shaped housing 5 of predetermined area, the same being constructed of sheet steel or other suitable material including side walls 6—6 suitably rigidly secured upon a base plate 7 having downturned flanges 8 at its edges and from the under side of which at the opposite ends of the plate depend supporting feet 9.

Figure 2:
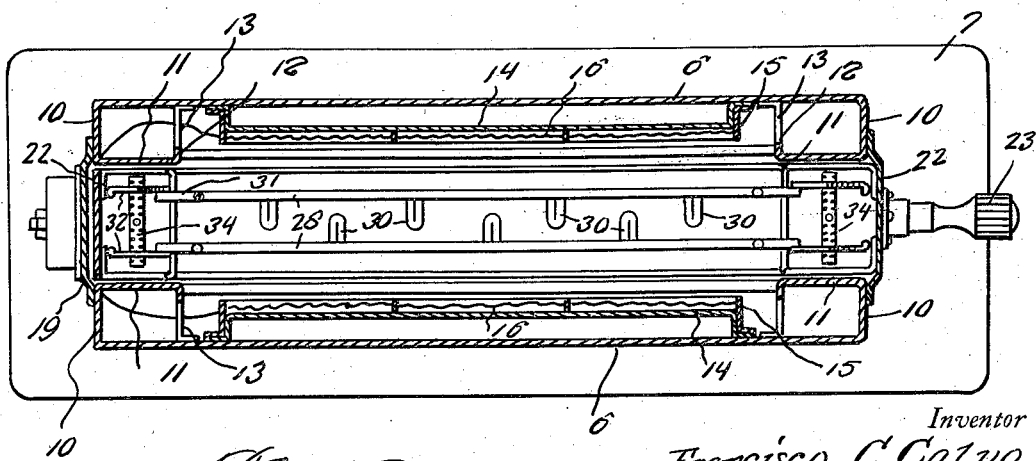
Figure 2 is a longitudinal section taken approximately on the line 2—2 of Figure 1.

The opposite vertical edges of the side walls 6—6 are bent inwardly at right angles as at 10—10 and thence reversely as at 11—11, the inner edges of these portions being flanged in a direction toward the side walls 6—6 as at 12—12, such formation of the opposite vertical edges of the material forming these side walls affording spacing boxings at said ends as clearly disclosed in Figure 2. At the upper and lower ends of the flanges 12—12 inwardly directed brackets 13—13 are formed so as to facilitate the securing of these boxings to the respective side walls preferably by rivets as indicated in Figure 4.

Arranged upon the inner faces of the housing side walls 6—6 intermediate the boxings at the opposite ends thereof are electric coil spacing walls 14—14 that are in spaced relation with the adjacent side walls 6—6 of the housing so as to insulate the heating coils therefrom, preventing the overheating of the housing. Arranged around the edges of these walls 14—14 are strips of insulating material 15—15 the edges of which overlie the outer sides of said walls while arranged longitudinally therebetween are insulated electric wires for providing heating units 16—16. As clearly disclosed in Figures 2 and 4, these heating units by reason of their supporting structure are arranged inwardly of the longitudinal faces of the boxings formed at the ends of the side wall.

Figure 1:
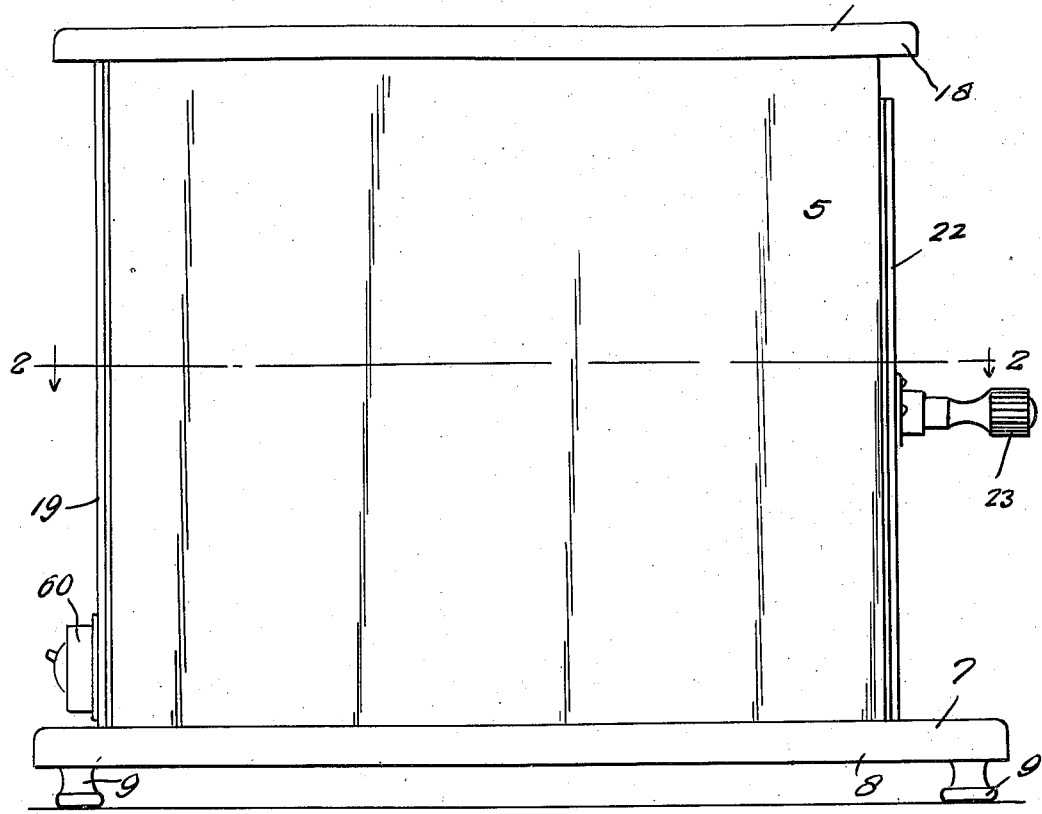
Figure 1 is a side elevation of the electric broiler embodying my invention.

Arranged upon the upper end of the housing 5 is a suitable lid 17 formed with downturned flanges 18 at its edges which overlie the upper end of the housing as clearly disclosed in Figures 1 and 4. Arranged between the boxings at certain adjacent ends of the housing side walls 6—6 is a vertical metallic strip 19, the opposite edges of which overlie the boxing for providing a closure for this end of the housing as clearly indicated in Figure 2. Arranged between the boxings at the opposite ends of the side walls 6—6 at the upper ends thereof is a cross strip 20 for providing a rigid closure for this end of the housing only at a point extending slightly beneath the lid 17, which lid is as disclosed in Figure 3 provided with ventilating openings 21.

Adapted for ready disposition within or removal from the housing 5 is a meat rack retaining housing consisting of a pair of vertical end walls 22—22, the innermost end of which is of a width slightly less than the space between adjacent boxings of the main housing side walls 6—6 so as to permit of the disposition of this rack housing within the main housing, the opposite end wall 22 being of a greater width so that the edges thereof will overlap the adjacent boxings of the main housing side walls 6—6 when said rack housing is disposed therein for providing a closure for these boxings as clearly disclosed in Figure 2. This overlapping end wall of the rack housing is equipped with a suitable outwardly extending handle 23 so as to facilitate the disposition of the rack housing into or out of the main housing 5. Said end walls 22—22 of the rack housing are joined at their lower ends by bottom wall 24 secured to the end walls 22—22 by suitable interior brackets 25—25, see Figure 3. The opposite longitudinal edges of the bottom wall 24 of the rack housing just described are provided with upwardly extending flanges 26—26, see Figure 4, which flanges cooperate with longitudinal guide strips 27—27 arranged in spaced parallel relation upon the main housing bottom wall 7 so as to facilitate the proper centering of the rack housing between the adjacent end boxes of the main housing side walls 6—6.

In the form of the invention disclosed in Figures 2, 3, 4 and 5, there is shown one type of meat rack that is especially designed for the maintenance in flat-like condition a meat or fish steak. As disclosed in these figures, said rack consists of a pair of relatively square shape steel wire frames 28—28 extending longitudinally across which are spaced frame wires 29, the lower horizontal portions of these frames 28—28 being so formed as to provide inwardly extending longitudinally spaced fingers 30 those of one frame being arranged intermediate those of the other frame so that the same will overlap as indicated in Figure 2 for preventing the food arranged between the frame units from dropping therethrough.

At opposite ends of each frame unit and intermediate the upper and lower edges thereof the main wires forming said frame are bent horizontally outwardly so as to provide arms 31—31 upon the ends of which are formed or rigidly arranged metallic plates 32—32 within each of which is a longitudinally extending elongated slot 33.

For securing the frame units 28—28 in clamped position upon the steak or other food being broiled, there is provided for each adjacent pair of plates 32—32 a locking key 34 illustrated in detail in Figures 8 and 9. Each locking key 34 comprises an elongated pin 35 having upon one end thereof a thumb plate 36 of a length greater than the length of the slots 33 in the rack frame plates 32. The opposite end of the pin 35 is formed with a cross plate 37 of a width sufficient to enable the insertion of the same through the said slots 33 of the rack frame plates 32, while intermediate the said thumb plate 36 and opposite end plate 37 said teeth or projections 35 is formed at opposed sides with spaced pins 38 also of a length sufficient to enable the same to be readily disposed through aligned slots in the plates 32 of the rack frame unit. Obviously when the frame units are firmly clamped upon the meat or other food being cooked, a pair of keys are arranged through the registering openings in adjacent plates 32—32 of the rack frame units and turned at substantially right angles as in Figure 3 so that adjacent teeth 38 of the keys will be extended upon opposite sides of the said slots 33 and the plates 32 for preventing the separation of the rack frame units. It is advisable that these keys 34—34 be permanently associated with one of the frame units so as to prevent the same from becoming lost. In carrying out this feature, a locking pin 39 is arranged through the main pin 35 of the key substantially intermediate the ends thereof after the key has been disposed through the slots 33 in the respective plate 32 of that particular rack frame unit 28.

In order to facilitate the support of the rack within its housing, the inner sides of the end walls 22—22 are provided at a point substantially intermediate their ends with box-like supporting brackets 40—40, the inner walls of which are channeled at their upper edges as indicated in Figure 3 so that the arms 31—31 of the frame units 28 may be supported thereon in such a manner that the plates 32—32 may be disposed within the boxings 40—40 to protect the locking keys from the grease and moisture splashing from the meat being broiled.

For maintaining the rack in proper vertical position within its housing there is provided a pair of spaced parallel and horizontally extending bars 41—41, the ends of which are down turned to provide pins 42—42 for detachable engagement within sleeve-like brackets 43—43, a pair of which is provided in spaced relation at the upper end of each of the rack housing end walls 22—22. Freely slidably disposed between these bars 41—41 is a pair of transversely extending plates 44—44 the ends of which are each formed with sleeves 45—45 for loose engagement upon said bars, the inner edges of these plates being formed with inwardly extending spaced teeth 46, the teeth of one plate being disposed in staggered relation with respect to the teeth of the opposite plate as clearly indicated in Figure 5. The upper edge of one of the rack units 28 is formed with a vertical pin 47, that is arranged between adjacent teeth of either one of the plates 44—44 depending upon the particular disposition of the pin 47 with respect thereto, the staggered relation of the teeth of these two plates 44—44 permitting of the securing of the pin 47 regardless of the thickness of the steak or other food arranged between the rack units 28—28.

In Figures 6 and 7, there is disclosed a slightly modified form of rack, the same consisting of a pair of rectangular shaped frame units 28'—28', which units are formed of narrow strips of sheet steel rather than of wire as disclosed in the form of the rack construction previously described, the same consisting also of horizontally extending spaced strips 29', while at the opposite ends of these frame units are outwardly extending arms 31' formed with flanged plates 32' within which are longitudinally extending elongated slots 33', so as to facilitate the securing of the frame units in adjusted position by reason of keys shown in Figures 8 and 9, previously described. In this form of the invention also one of the rack units is formed at its upper edge with a vertically extending pin 47' similar in purpose to the pin 47 in the type of rack disclosed in Figures 2, 3, 4 and 5. In this instance, however, the opposite ends of one of the frame units 28' is formed or provided with pairs of spaced inwardly extending pins 50—50 for sliding disposition between pairs of outwardly extending lugs 51—51 upon the ends of the other frame unit 28' as is clearly disclosed.

In Figures 10, 11, and 12 there is disclosed a broiling pan for the reception of sausages, small chops and the like to facilitate the broiling thereof within the present electrical broiler. This pan is preferably constructed of sheet metal, the same consisting of a pair of side walls 52—52 of sheet metal joined at their lower edges by a bottom wall 53, while arranged between the ends of these side walls are end walls 54—54, the lower edges thereof projecting beyond the said bottom wall 53 and being formed with pairs of supporting feet 55—55 for rest upon the bottom wall 24 of the previously described rack housing. Arranged perpendicularly between the side walls 52 in spaced relation with the end walls 54—54 are partitions 56 which partitions, end walls and side walls are formed with large openings as clearly disclosed in Figures 10 and 11 so as to permit the heat from the heating coils of the broiler to pass therethrough. Furthermore, the end walls and partitions are rigidly secured intermediate the side walls 52—52 and bottom wall 53 which is formed with small openings as disclosed in Figures 10 and 12 by tongue and slot connections of a well known design, more clearly disclosed in Figure 10. Insomuch as no claim is made in this application to this form of pan, the said connections as well as the general construction thereof is only described in a general manner. The upper edges of the side walls 52—52 are formed with longitudinally extending turned-over channels 56—56 that extend considerably beyond the ends of the pan as in Figure 10. Arranged within the ends of these channels are pins 58 that extend outwardly therefrom for rest upon brackets 59—59 upon the inner faces of the rack housing end walls 22—22 at a point beneath the supporting brackets 43 for the ends of the guide strip supporting bars 41—41 see Figure 3.

In carrying out the invention it is preferable that a drip pan 59 be removably disposed upon the bottom wall 24 of the rack housing so as the grease and moisture falling from the meat may be caught therein and properly discharged when the housing and rack is removed.

Insomuch as no particular construction of heating coil formation is necessary in carrying out the present invention such has only been shown and described generally. However, the wires of these coils are connected to a suitable switch 60 arranged upon the end wall 19 of the main broiler housing, while in circuit between this switch and said coil at any convenient point upon the housing is a suitable plug in socket, not disclosed, so that the same may be electrically connected with the house circuit.

The specific construction and operation of an electric broiler of this character will be readily appreciated by those skilled in the art, and even though I have herein shown and described the invention as consisting of certain detail structural elements it is nevertheless to be understood that some changes may be made therein without affecting the spirit and scope of the appended claims.

Having thus described the invention, what I claim as new is:—

1. In an electric broiler of the character described, a main housing having one open end, heating coils arranged within the housing at the side walls thereof, a rack housing constructed for removable disposition within the main housing and having open sides, one end wall of said rack housing adapted to form a closure for the open end of the main housing, when said rack housing is disposed therein and a food retaining rack removably associated with the interior of said second housing.

2. In an electric broiler of the character described, a main housing having one open end, heating coils arranged within the housing at the side walls thereof, a rack housing constructed for removable disposition within the main housing and having open sides, one end wall of said rack housing adapted to form a closure for the open end of the main housing, when said rack housing is disposed therein, a food retaining rack removably associated with the interior of said second housing, said rack consisting of a pair of open frames between which the food is to be disposed, means for rigidly securing the frames together, and complementary means between the frames and its housing for facilitating the detachable support of the rack within said housing.

3. In an electric broiler of the character described, a main housing having one open end, heating coils arranged within the housing at the side walls thereof, a rack housing constructed for removable disposition within the main housing and having open sides, one end wall of said rack housing adapted to form a closure for the open end of the main housing, when said rack housing is disposed therein, a food retaining rack removably associated with the interior of said second housing, said rack consisting of a pair of open frames between which the food is to be disposed, means for rigidly securing the frames together and complementary means between the frames and its housing for facilitating the detachable support of the rack with said housing, and means for maintaining the rack in vertical position within its housing.

4. In an electric broiler of the character described, a main housing having one open end, heating coils arranged within the housing at the side walls thereof, a rack housing constructed for removable disposition within the main housing and having open sides, one end wall of said rack housing adapted to form a closure for the open end of the main housing, when said rack housing is disposed therein, a food retaining rack removably associated with the interior of said second housing, said rack consisting of a pair of open frames between which the food is to be disposed, means for rigidly securing the frames together, complementary means between the frames and its housing for facilitating the detachable support of the rack with said housing, means for maintaining the rack in vertical position within its housing, said means being adjustable to support the rack regardless of the spaced condition of its frames.

5. In an electric broiler of the character described, a main housing having an open end, electric heating coils upon the inner faces of the opposed sides of the housing, a meat rack housing readily movable into the main housing through the open end thereof, said rack housing including end walls, one of which functions as a closure for the open end of the main housing, and means within the second housing for removably supporting food retaining units therein.

6. In a meat rack for broilers, a pair of frame units between which the meat is to be disposed, and means for adjustably connecting the frame units together, said means including arms extending laterally from the ends of the frame units, slotted plates carried by said arms, a locking key for disposition through each pair of slotted plates, and laterally projecting teeth carried by each key for disposition on opposite sides of the adjacent slotted plate when the key is turned in one direction to prevent sliding movement of the key and to hold the frame unit in adjustably connected relation.

7. In combination, a meat rack housing including vertical end walls and a bottom wall, a pair of spaced bars extending longitudinally between the upper ends of the end walls of said housing, a meat rack for removable disposition within the housing, said meat rack including a pair of frame units adjustably connected together, supporting means for the meat rack within the housing, and cooperating means between the meat rack and said aforementioned bars to maintain the meat rack in a vertical position within the housing.

8. In combination, a meat rack housing including vertical end walls and a bottom wall, a pair of spaced bars extending longitudinally between the upper ends of the end walls of said housing a meat rack for removable disposition within the housing, said meat rack including a pair of frame units adjustably connected together, supporting means for the meat rack within the housing, cooperating means between the meat rack and said aforementioned bars to maintain the meat rack in a vertical position within the housing, said last mentioned means comprising an upwardly extending pin carried by the upper portion of one of the frame units and extending between said bars, and a toothed plate slidable on the bars, the upper end of the pin engaging between the teeth of the plate.

In testimony whereof I affix my signature.

FRANCISCO C. CALVO.